3,396,187
β-DI AND TRINITRO CARBONATES AND
METHOD FOR THEIR PRODUCTION
Theodore M. Benziger, Leonard W. Kissinger, and Herbert E. Ungnade, Los Alamos, N. Mex., assignors to the United States of America as represented by the United States Atomic Energy Commission
No Drawing. Filed June 3, 1964, Ser. No. 372,420
9 Claims. (Cl. 260—463)

ABSTRACT OF THE DISCLOSURE

A method for the esterification of aliphatic beta di- and trinitro alcohols with an acid chloride and pyridine and compounds formed by this method. These compounds are useful as components of explosives and propellants.

---

This invention relates to a method for the esterification of beta di- and trinitro alcohols and diols with acid chlorides and pyridine.

While the prior art discloses the use of pyridine, a basic substance, in various esterification processes, it has not been used to esterify di- or trinitro alcohols (beta-nitro alcohols) because these alcohols as a class are considered unstable in most basic environments, where they are partially degraded to formaldehyde and di- or trinitroparaffin. It has now been found that such β-nitro alcohols and diols form complexes with anhydrous pyridine without such a degradation and that these complexes react smoothly with acid chlorides in a suitable anhydrous solvent to give β-nitro esters in good yields and high purity. The rapid reaction of β-di- and trinitro alcohols with pyridine and acid chlorides under mild conditions is particularly useful with low boiling or gaseous acid chlorides such as phosgene and for the esterification of heat sensitive alcohols and acid chlorides. This same type process can be used to react simple acid chlorides (RCOCl), chlorocarbonates (ROCOCl), chlorides derived from dibasic acids, and those from inorganic acids, e.g., phosphoric, phosphorous, sulfuric, sulfonic, sulfurous, silicic and carbonic acids.

The reaction is used with β,β-dinitro alcohols $$RC(NO_2)_2CH_2OH$$

where R=alkyl, halogen, nitro, $CH_2OH$ or other substituted alkyl or aryl groups, giving a wide variety of β,β-dinitro alkyl esters. The uses of such esters are many, but they have been found valuable as components of explosives and propellants.

To more clearly illustrate this invention the following examples are presented. (All temperatures are in degrees centigrade.)

Example I.—Preparation of 2,2-dinitropropyl carbonate

A solution of 3.0 g. (0.02 mole) of 2,2-dinitropropanol and 1.6 g. (0.02 mole) of pyridine in 30 cc. of methylene chloride is refluxed for 10 min. and cooled to 0°. Phosgene gas is added with ice cooling and stirring through a sparger. The resulting solution is refluxed for 4 hrs., washed with 3 volumes of water, dried over sodium sulfate, and evaporated. Crystallization of the solid residue from methylene chloride-petroleum ether gives 3.1 g. (95%) of 2,2-dinitropropyl carbonate, M.P. 120–121°.

Analysis.—Calculated for $C_7H_{10}N_4O_{11}$: C, 25.77; H, 3.09; N, 17.18. Found: C, 26.10; H, 3.56; N, 16.84.

Example II.—Preparation of ethyl 2,2,2-trinitroethyl carbonate

Pyridine (0.395 g., 0.005 mole) is added with stirring to a solution of trinitroethanol (0.905 g., 0.005 mole) in 10 ml. of methylene chloride. To this solution is added ethyl chloroformate and the mixture is refluxed 4 hrs. The formed pyridine salt is removed by washing with 7% hydrochloric acid and water and the solution is dried and evaporated. The residual oil (1.13 g., 89%) is distilled from a molecular still. It boils at 40° (0.05 mm.), solidifies, and melts at 45–46°.

Analysis.—Calculated for $C_5H_7N_3O_9$: C, 23.73; H, 2.79; N, 16.60. Found: C, 23.65; H, 3.06; N, 16.45.

Example III.—Preparation of 2,2-dinitrotrimethylene carbonate

The standard procedure of adding acid chloride (phosgene) to a methylene chloride solution of 2,2-dinitro-1,3-propanediol and 2 molar equivalents of pyridine gives 80–85% cyclic carbonate and 10% polycarbonate (infrared analyses). Washing out the pyridine salt, however, hydrolyses most of the cyclic carbonate so that only 15% is isolated.

When 2,2-dinitro-1,3-propanediol·2 pyridine complex in methylene chloride is added to phosgene in methylene chloride in such a way that phosgene is always in excess. The reaction mixture contained only cyclic carbonate and pyridinium chloride. Crystallization of the mixture from a little methylene chloride gives 43% of pure 2,2-dinitrotrimethylene carbonate, M.P. 128–130°.

Analysis.—Calculated for $C_4H_4N_2O_7$: C, 25.01; H, 2.10; N, 14.58. Found: C, 24.68; H, 2.40; N, 14.30.

Example IV.—Preparation of 2-bromo-2,2-dinitroethyl acetate

A mixture of 2 - bromo - 2,2 - dinitroethanol (0.0125 mole), pyridine (0.0125 mole), and acetyl chloride (0.0125 mole) in 10 ml. of methylene chloride is refluxed for 2 hrs. The solution is then washed, dried, and evaporated to give 84% of crude oil, which is distilled from a molecular still and boiled at 45° (0.02 mm.), $n_D^{25}$ 1.4737.

Numerous other compounds can be prepared in accordance with the procedure used in the examples set forth above. The esterification of 2,2-dinitropropanol with suitable acid chlorides and pyridine has given in this fashion: 2,2-dinitropropyl benzenesulfonate, p-toluenesulfonate, acetate, benzoate, methyl carbonate, ethyl carbonate, terephthalate, sulfite, phosphate and dimethyl siloxane. Corresponding esters can be prepared from 2,2,2-trinitroethanol, 2-chloro-2,2-dinitroethanol, 2-bromo-2,2-dinitroethanol, and 2,2-dinitro-1,3-propanediol.

It will be understood that this invention is not to be limited to the details given herein, but that it may be modified within the scope of the appended claims.

What is claimed is:

1. As a composition of matter, 2,2-dinitro-3-hydroxypropyl ethyl carbonate, having the structural formula:

$$HOCH_2C(NO_2)_2CH_2OCOOEt$$

2. As a composition of matter, 2,2-dinitropropyl methyl carbonate, having the structural formula:

$$MeC(NO_2)_2CH_2OCOOMe$$

3. As a composition of matter, 2,2-dinitropropyl ethyl carbonate, having the structural formula:

$$MeC(NO_2)_2CH_2OCOOEt$$

4. As a composition of matter, ethyl 2,2,2-trinitroethyl carbonate, having the structural formula:

$$C(NO_2)_3CH_2OCOOEt$$

5. As a composition of matter, 2-chloro-2,2-dinitroethyl ethyl carbonate, having the structural formula:

$$CCl(NO_2)_2CH_2OCOOEt$$

6. A method of preparing esters from beta-di and trinitro aliphatic alcohols comprising heating at least one of the said alcohols with phosgene and pyridine in dichloroethane and isolating the formed ester.

7. The method of claim 6 in which the beta-nitro alcohol is 2,2-dinitropropanol.

8. The method of claim 6 in which the beta-nitro alcohol is 2,2,2-trinitroethanol.

9. The method of claim 6 in which the beta-nitro alcohol is 2,2-dinitro-1,3-propanediol.

References Cited

UNITED STATES PATENTS

| 938,132 | 10/1909 | Einhorn | 260—463 |
| 1,877,304 | 9/1932 | Grether | 260—463 |
| 3,120,554 | 2/1964 | Baker et al. | 260—463 |

OTHER REFERENCES

Chem. Abstracts, vol. 56, 14071 (h), Kissinger et al. 1962.

Groggins: Unit Processes in Organic Synthesis, p. 640, 3rd Ed., 1947.

CHARLES B. PARKER, *Primary Examiner.*

L. C. MARUZO, *Assistant Examiner.*

Disclaimer 3,396,187.—*Theodore M. Benziger, Leonard W. Kissinger* and *Herbert E. Ungnade*, Los Alamos, N. Mex. β-DI AND TRINITRO CARBONATES AND METHOD FOR THEIR PRODUCTION. Patent dated Aug. 6, 1968. Disclaimer filed Oct. 22, 1969, by the assignee, *United States Atomic Energy Commission.*

Hereby enters this disclaimer to claim 2 of said patent.

[*Official Gazette January 20, 1970.*]